(12) United States Patent
Thompson (10) Patent No.: US 12,092,484 B1
(45) Date of Patent: Sep. 17, 2024

(54) TANK AND TANK PROBE ASSEMBLY AND METHOD OF MAKING SAME

(71) Applicant: Peak Plastics, LLC, Constantine, MI (US)

(72) Inventor: Matthew A. Thompson, White Pigeon, MI (US)

(73) Assignee: Peak Plastics, LLC, Constantine, MI (US)

( * ) Notice: Subject to any disclaimer, the term of this patent is extended or adjusted under 35 U.S.C. 154(b) by 0 days.

(21) Appl. No.: 18/436,804

(22) Filed: Feb. 8, 2024

Related U.S. Application Data

(60) Provisional application No. 63/509,366, filed on Jun. 21, 2023.

(51) Int. Cl.
*G01D 11/24* (2006.01)

(52) U.S. Cl.
CPC .................. *G01D 11/245* (2013.01)

(58) Field of Classification Search
CPC ...................................................... G01D 11/245
See application file for complete search history.

(56) References Cited

U.S. PATENT DOCUMENTS 5,661,251 A * 8/1997 Cummings ........... G01F 23/284
73/866.5

FOREIGN PATENT DOCUMENTS

| CH | 651390 A5 * | 9/1985 | |
|---|---|---|---|
| CN | 102824692 A * | 12/2012 | |
| CN | 104344841 A * | 2/2015 | ............ C12M 23/00 |
| DE | 102009043162 B3 * | 9/2010 | ............. B21D 39/06 |

* cited by examiner

*Primary Examiner* — Jamel E Williams
(74) *Attorney, Agent, or Firm* — Gardner, Linn, Burkhart & Ondersma LLP (57) ABSTRACT

A probe assembly for a tank includes a probe having a shaft with a proximal end and a distal end, and further includes an enlarged head at the distal end. A seal is formed from a plastic material and is mounted about the shaft adjacent the enlarged head. The seal has a hollow cylindrical body with a distal end and a proximal end, and further has a flange extending radially outward at the proximal end of the hollow cylindrical body spaced from the enlarged head. The cylindrical body has a uniform wall thickness extending from the proximal end to the flange.

20 Claims, 6 Drawing Sheets

TANK AND TANK PROBE ASSEMBLY AND METHOD OF MAKING SAME

CROSS REFERENCE TO RELATED APPLICATION

The present application claims the benefit of U.S. Prov. Appl. Ser. No. 63/509,366, filed on Jun. 21, 2023, which is incorporated by reference herein in its entirety.

TECHNICAL FIELD AND BACKGROUND

The present disclosure relates to a tank and a probe assembly for a tank, which is used to determine the tank fluid level.

There are many ways determine the fluid level in a tank. For example, windows may be provided in the tank wall to provide a visual indication of the tank fluid level.

In some industries, another more common approach is to mount probes at different heights in the tank wall, which detect the presence of moisture to determine the fluid level. These probes include a threaded fastener, which extends through an opening formed in the wall of the tank, and an annular seal. The seal is compressed by the threaded fastener when the probe is installed and tightened. These probes are often not installed by the tank manufacturer and, hence, are subject to installer variations. Consequently, leaks are not uncommon-either due to the opening being drilled too large or too small or due to over tightening of the fastener.

SUMMARY

A tank and probe assembly for mounting in the wall of the tank is described herein. The probe assembly is formed with a seal that is configured with a controlled crush region that reduces, if not eliminates, leakage from the connection of the probe to the tank wall.

In one form a probe assembly has a probe formed from a shaft with a proximal end and a distal end, and an enlarged head formed at the distal end. A seal formed from a plastic material is mounted about the shaft adjacent the enlarged head. The seal has a hollow cylindrical body with a distal end and a proximal end, and a flange extending radially outward at the proximal end of the hollow cylindrical body and spaced from the enlarged head. The cylindrical body has a uniform wall thickness extending from the proximal end to the flange and forms a crush region of the seal.

In one aspect, the seal forms a gap between the shaft and the hollow cylindrical body over a portion of the shaft.

In another form, a probe assembly for a tank includes a probe formed from a shaft with a proximal end and a distal end, and an enlarged head at the distal end of the shaft. The shaft has a threaded section, an unthreaded section, and a knurled section, with the threaded section extending from the proximal end and terminating at the unthreaded section. The unthreaded section extends between the threaded section and the knurled section. A seal formed from a plastic material is molded about the shaft and engaged only with the knurled section.

The seal is molded about the shaft about the unthreaded section but spaced from the unthreaded section.

In either probe assembly above, the seal may be molded about the shaft about a portion of the threaded section, but forms a gap between the seal and the threaded section.

In other aspects, the seal further includes a flange extending radially outward and being spaced from the enlarged end of the shaft.

In another aspect, the seal has a hollow cylindrical body with a distal end and a proximal end, with the flange extending radially outward at the proximal end of the hollow cylindrical body, and optionally the cylindrical body having a uniform wall thickness extending from the proximal end to the flange.

In another form, a probe assembly for a tank includes a probe having a shaft with a proximal end and a distal end, and an enlarged head at the distal end. The shaft has a threaded section and an unthreaded section, with the threaded section extending from the proximal end and terminating at the unthreaded section and, further, terminating at a distance spaced from the enlarged head. A seal formed from a plastic material is mounted about the shaft adjacent the enlarged head, which has a hollow cylindrical body with a length, a distal end, and a proximal end spaced along the length from the distal end. The seal further has a flange extending radially outward at the proximal end of the hollow cylindrical body spaced from the enlarged head. The hollow cylindrical body has a uniform wall thickness extending from the distal end of the hollow cylindrical body to the flange and forming a gap with the shaft over a portion of shaft.

In one aspect, the seal is molded about the shaft about the unthreaded section.

In another aspect, the seal is molded about the shaft about a portion of the threaded section and forms a gap between the seal and the threaded section.

In another aspect, the seal forms a gap between the seal and at least a portion of the unthreaded section.

In another form, a probe for a tank probe assembly includes a shaft with a proximal end and a distal end. The probe includes an enlarged head at the distal end. The shaft has a threaded section, an unthreaded section, and a knurled section, with the threaded section extending from the proximal end and terminating at the unthreaded section and terminating at a distance spaced from the enlarged head, with the unthreaded section extending between the threaded section and the knurled section.

In one aspect, the knurled section extends between the enlarged head and the unthreaded section.

In another form, a method of making a probe assembly includes the steps of providing a metal shaft with an enlarged head on a distal end of the metal shaft, forming threads on only a portion of the metal shaft spaced from the enlarged head, covering only a portion of the metal shaft with a sleeve leaving a portion of the metal shaft uncovered by the sleeve; molding a plastic seal on the metal shaft and on the sleeve; and removing the sleeve relative to the metal shaft to thereby leave a gap between the seal and the metal shaft on the portion of the metal shaft where the sleeve was previously located.

In one aspect, the method further includes forming a knurled section on the metal shaft, and the molding the plastic seal comprises molding the plastic seal on the knurled section of the metal shaft.

DETAILED DESCRIPTION

Figures 1, 1A:
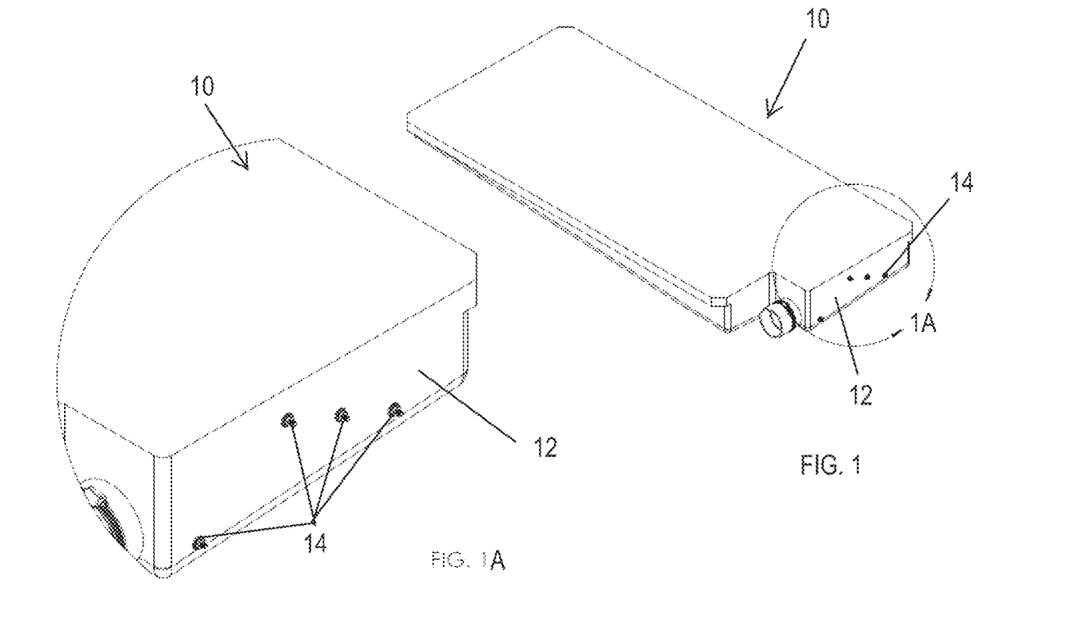
FIG. 1 is a perspective view of a tank with probe assemblies mounted in a wall of the tank at different heights.
FIG. 1A is an enlarged view of section 1A of FIG. 1.

Referring to FIG. 1, the numeral 10 generally designates a tank for holding fluids. Tank 10 includes a tank wall 12 with a probe assembly 14 mounted in the tank wall 12 at a designated tank level for sensing whether the level of liquid, such as water, including waste water, in the tank 10 has dropped below or, conversely, has reached the designated tank level. As will be more fully described below, each probe assembly 14 is mounted in the tank wall through an opening 12a (FIG. 2) formed in the tank wall and is configured to avoid damage due to over tightening of the probe assembly when installed. Further, the probe assembly 14 is configured to accommodate a wide range of tank wall thicknesses while still providing the desired sealed connection with the tank wall.

Figure 2:
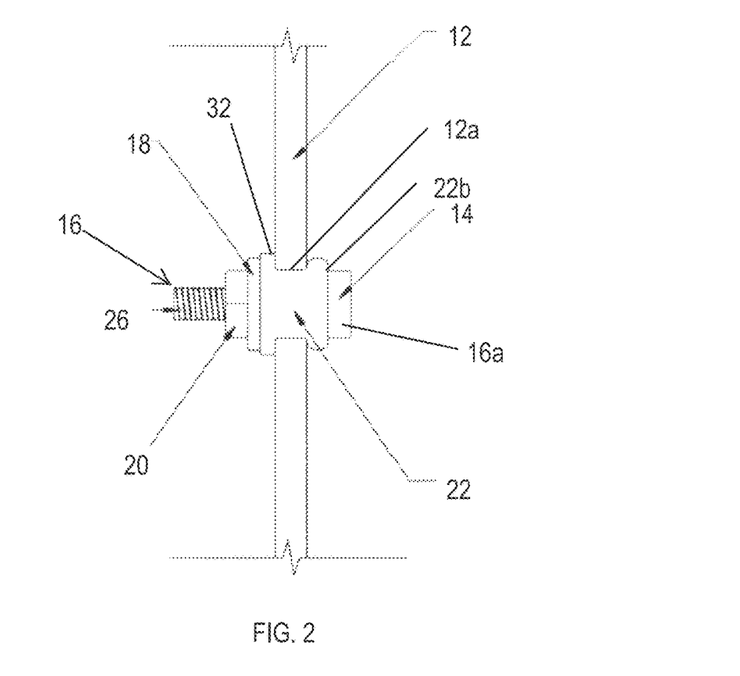
FIG. 2 is an enlarged side view of one of the probe assemblies installed in a section of the wall of the tank illustrating the probe in an installed configuration.
Figure 3:
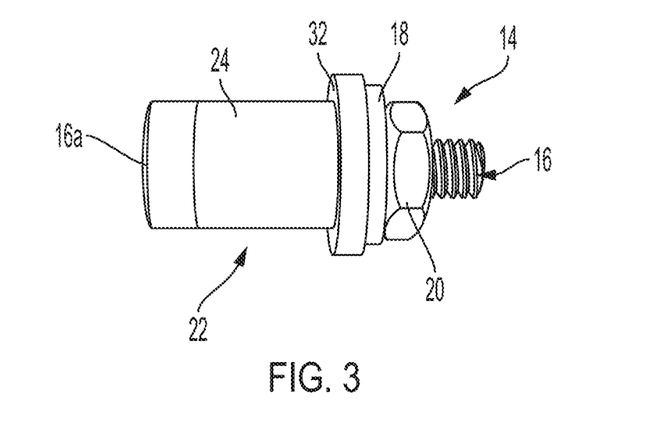
FIG. 3 is an enlarged side view of the probe assembly with the seal mounted to the probe, shown in an uninstalled state.
Figure 8:
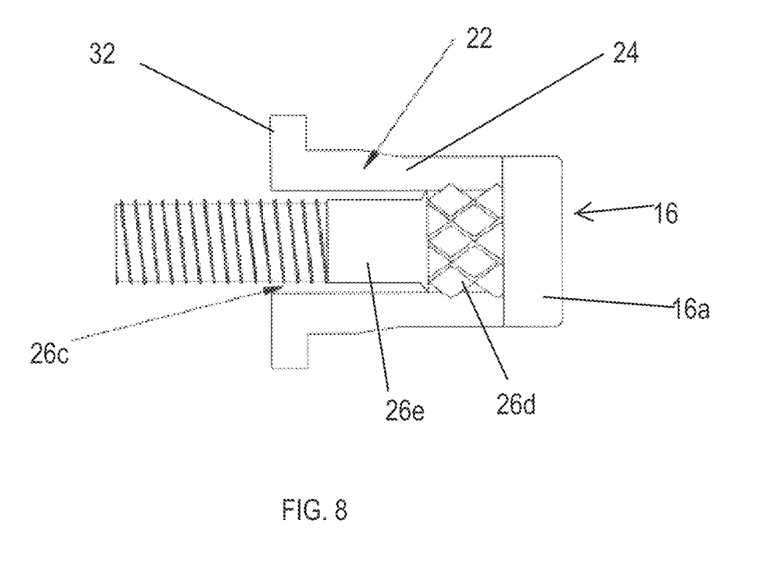
FIG. 8 is a cross-section of the probe and the seal molded onto the probe with the sleeve moved from the probe assembly after molding.

Referring to FIGS. 2 and 3, probe assembly 14 includes a probe 16, a washer 18, and a nut 20 for tightening the probe in the tank wall 12. In addition, probe assembly 14 includes a seal 22, which seals the opening in the tank wall 12 when the probe assembly 14 is inserted into the opening 12a and tightened, as more fully described below. Further, seal 22 is formed about probe 16, such as by molding, in a manner to form a controlled crush region 24 (FIG. 3) in the seal. In this manner, when the probe 16 is tightened using the nut 20, the controlled crush region 24, which will also be more fully described below in reference to FIG. 8, will crush in a controlled direction and only to a specified amount, which is dictated by the probe construction, as will be more fully described below.

Figure 5:
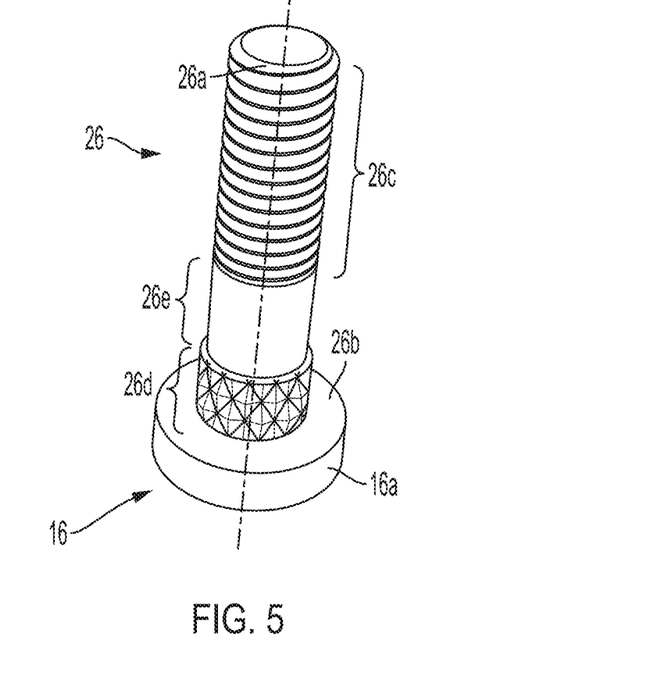
FIG. 5 is an enlarged side view of the probe without the seal.
Figure 6:
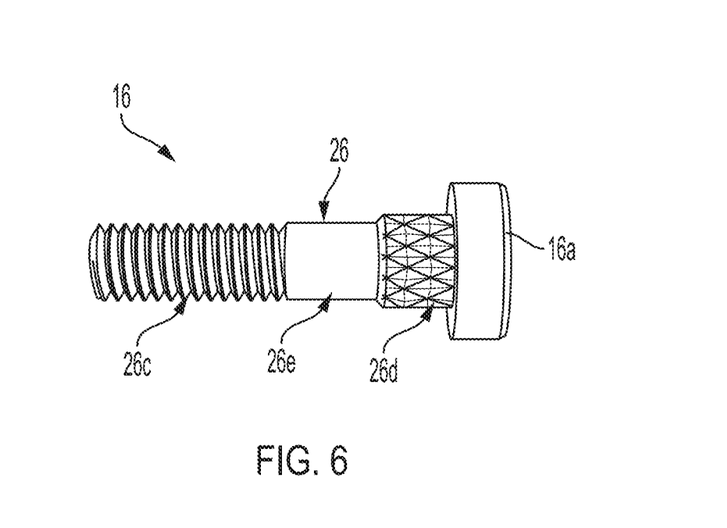
FIG. 6 is another enlarged side view of the probe without the seal.

As best seen in FIGS. 5 and 6, probe 16 includes a shaft 26 with a proximal end 26a (the end on the outside of the tank) and a distal end 26b (the end that is inside the tank) with an enlarged head 16a at its distal end 26b. The enlarged head 16a, which is located inside the tank 10 when probe assembly is installed (see FIG. 2), forms sensing end of the probe. Shaft 26 also includes a threaded portion 26c (which includes proximal end 26a), and a knurled portion 26d, which is adjacent enlarged head 16a and spaced from threaded portion 26c. Shaft 26 also includes a smooth portion 26e, which is located between threaded and knurled portions 26c and 26d. As will be more fully described below seal 22 is molded about a portion of threaded portion 26c, knurled portion 26d, and smooth portion 26e, but only molded and engaged with knurled portion 26d and, further, so that it is spaced from the outer surfaces of threaded portion 26c and smooth portion 26e. It should be understood that seal may also be only molded about smooth portion 26e and knurled portion so that is does extend over any threaded of threaded portion 26c. In this manner, a portion of the seal is decoupled from the shaft to form crush region 24 so that seal 22 can be crushed along longitudinal axis 16b of shaft 16 in a controlled manner.

As best seen in FIG. 6, threaded portion 26c and smooth portion 26e of shaft 26 generally have the same outer diameter to facilitate the assembly of probe assembly 14 as described below. Knurled portion 26d may have a larger diameter than threaded portion 26c and smooth portion 26e again to facilitate the assembly of probe assembly 14 as described below. Enlarged head 16a has a larger diameter than knurled portion 26d, threaded portion 26c, and smooth portion 26e to retain the probe assembly in the tank wall when probe assembly 14 is installed and tightened by nut 20. Alternately, knurled portion 26d may have a smaller diameter than both the enlarged head 16a and the smooth portion 26e.

As noted above, seal 22 is molded about probe 16. Seal 22 is formed from a plastic, such as a synthetic rubber, including thermoplastic vulcanizate (TPV). Prior to molding seal 22 about shaft 26, probe 16 is inserted into a sleeve 30 supported in the mold apparatus 50, such as an injection molding apparatus. Mold apparatus 50 includes a mold base 50a with a recess 50b, which holds sleeve 30, and a mold plate 50c that forms a mold cavity 50d together with mold base 50a when the mold plate 50c is moved to its closed position.

Figure 7:
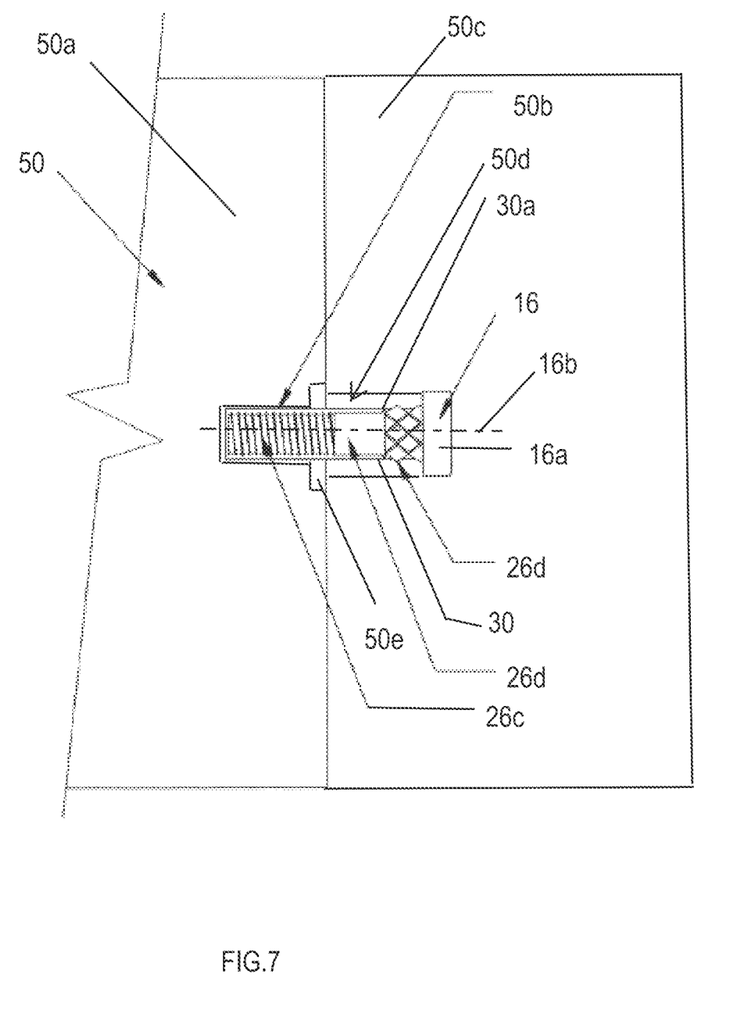
FIG. 7 is a side view of the probe inserted into a sleeve in the mold prior to molding the seal onto the probe and the sleeve.

As best seen in FIG. 7, sleeve 30 is sized so that when probe 16 is inserted into sleeve 30, the sleeve 30 abuts the end of knurled portion 26d of shaft 23, and in effect closes off the threaded portion 26c and smooth portion 26d to form a shut off for the injected plastic. In this manner, the sleeve 30 covers smooth portion 26e and threaded portion 26c and prevent the plastic from adhering to the smooth portion 26e and threaded portion 26c. It should be understood that in some embodiments the sleeve may be modified to form a shut off offset from the end of the knurled portion so that plastic may be molded onto a portion of the smooth portion.

Figure 4A:
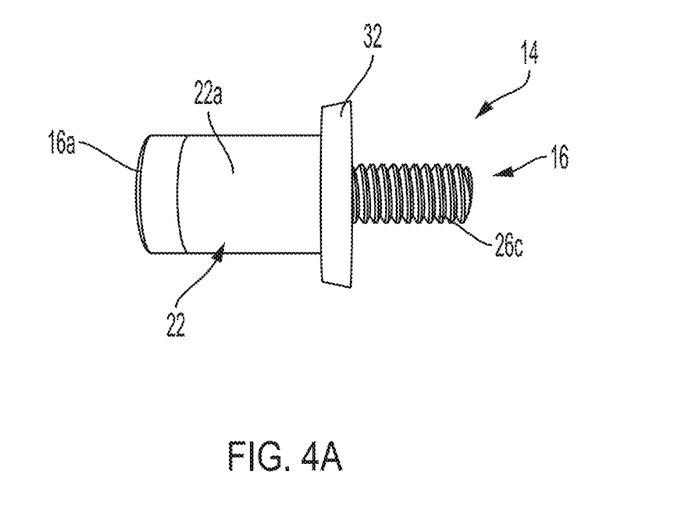
FIG. 4A is an enlarged view of the probe assembly with the nut and washer removed.
Figure 4B:
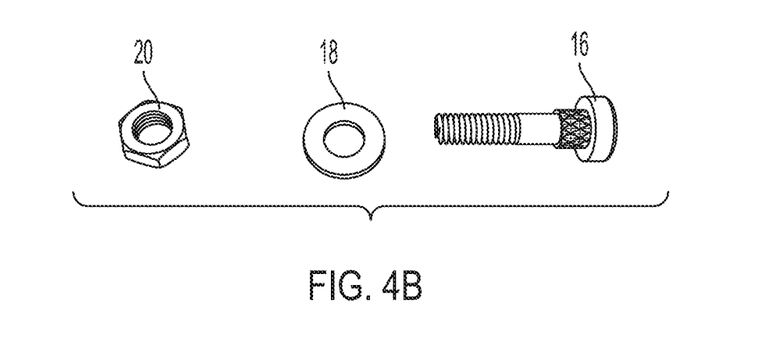
FIG. 4B is an enlarged exploded perspective view of the probe assembly without the seal.

When probe 16 is inserted into recess 50b and into sleeve 30, as best understood from FIG. 7, a portion of the probe and sleeve are extended from mold base 50a but then surrounded by mold cavity 50d when mold plate 50c is moved to its closed position where the material forming the seal is injected. The mold cavity 50d is sized to receive the probe but to from a shut off adjacent enlarged head 16a so that enlarged head 16a is located outside of the mold cavity 50d and, therefore, not molded with the seal material. Additionally, the mold cavity 50d is shaped and sized so that when injected with the seal material will form a cylindrical seal body with a uniform outer diameter over the majority of its length along longitudinal axis 16b, but to limit the length of the seal material so that it only extends over one or two threads of threaded portion 26c (or in some cases no threads). In addition, mold cavity 50d is formed with an annular recess 50e surrounding recess 50b to form a flange 32 (FIG. 3) with the seal material, which extends radially outward from cylindrical seal body 22a (see FIG. 4A). The mold cavity 50d includes an enlarged annular portion 50e to form flange 32, which is formed on the proximal end of the seal about or adjacent the terminal end of the threaded portion 26c and extends radially outward at the proximal end of seal 22. Flange 32 forms a bearing surface for the washer 18, and may be sized so that it is larger than washer 18, so that when the nut is tightened in probe 16, the washer will compress the seal 22 along longitudinal axis 16b of probe 16.

Once probe 16 is inserted into sleeve 30, and the mold cavity is located around probe, the seal material is injected into the mold cavity, using conventional injection molding techniques. After the seal has at least partially cured, the probe is removed from the mold cavity, and hence removed from the sleeve. Once the probe is removed, the seal is molded about, but not engaged with the smooth portion or the threaded portion of the probe and, instead, is spaced from and forms a gap (the thickness of the sleeve and any air gap between the sleeve and the probe) between the seal 22 and the threaded portion 26*c* and the smooth portion 26*e* of the shaft 26. For example, the seal 22 may be spaced from shaft 26 in a range of ¹/₁₂₈th to ¹/₃₂th of an inch. In this manner, when seal 22 is compressed during installation, a portion of the seal can move and axially along the probe and compress along longitudinal axis 16*b* of probe 16 to fill any gap that may exist between the probe and the tank wall. Further, as best seen in FIG. 2, the seal 22 may form a bulb seal on the inside of the tank due to the seal's rubber-like properties while still remaining mechanically attached to the probe at the knurled portion 26*d*.

Alternately, the sleeve 30 may be mounted on the probe prior to placement in the mold cavity and then both removed from the mold apparatus after the probe is molded with the seal. In this case, the sleeve would be removed from the probe after the seal is at least partially cured. Therefore, when referring to the seal being moved relative to the probe, it should be understood that this covers either process when the probe is removed from the sleeve or the sleeve is removed from the probe.

As best seen in FIG. 2, during installation and when the nut 20 is tightened on the threaded portion 26*c* of shaft 26, as noted, the seal 22 will also tend to form a bulge 22*b* adjacent the enlarged head 16, and hence for a bulb seal, while still remaining molded to the knurled portion 26*d* of shaft 26, which is formed by the crush portion 24 and the rubber nature of the seal material.

By releasing the seal from the smooth and threaded portions of shaft 26, the seal forms a hollow cylindrical body with a uniform wall thickness that extends from the flange to the knurled portion of the shaft where the molded seal is mechanically engage with the shaft. As a result, the seal compresses in a controlled fashion along longitudinal axis 16*b* of probe 16

It will be appreciated that numerous various to the above-mentioned approaches are possible. Variations to the above approaches may, for example, include performing the above steps in a different order.

While certain exemplary embodiments have been described and shown in the accompanying drawings, it is to be understood that such embodiments are merely illustrative of are not restrictive on the broad disclosure, and that this disclosure is not limited to the specific constructions and arrangements shown and described, since various other modifications may occur to those of ordinary skill in the art. The description is thus to be regarded as illustrative instead of limited.

I claim:

1. A probe assembly for a tank, said probe assembly comprising:
   a probe having a shaft with a proximal end and a distal end, said probe including an enlarged head at said distal end; and
   a seal being formed from a plastic material and being mounted about said shaft adjacent said enlarged head, said seal having a hollow cylindrical body with a distal end and a proximal end, said seal further having a flange extending radially outward at said proximal end of said hollow cylindrical body spaced from said enlarged head, and said cylindrical body having a uniform wall thickness extending from said proximal end to said flange wherein said seal forms a gap between said shaft and said hollow cylindrical body over a portion of said shaft.

2. A probe assembly for a tank, said probe assembly comprising:
   a probe having a shaft with a proximal end and a distal end, said probe including an enlarged head at said distal end; and
   a seal being formed from a plastic material and being mounted about said shaft adjacent said enlarged head, said seal having a hollow cylindrical body with a distal end and a proximal end, said seal further having a flange extending radially outward at said proximal end of said hollow cylindrical body spaced from said enlarged head, and said cylindrical body having a uniform wall thickness extending from said proximal end to said flange, wherein said shaft has a threaded section, an unthreaded section, and a knurled section, said threaded section extending from said proximal end of said shaft and terminating at said unthreaded section, said unthreaded section extending between said threaded section and said knurled section.

3. The probe assembly according to claim 2, said seal being molded (1) about said shaft about said knurled section or (2) about said shaft about said knurled section and said unthreaded section.

4. The probe assembly according to claim 2, said seal being molded about said shaft about a portion of said threaded section and forming a gap between said seal and said threaded section.

5. The probe assembly according to claim 2, said seal forming a gap between said seal and at least a portion of said unthreaded section.

6. The probe assembly according to claim 2, wherein said seal further having a flange extending radially outward and spaced from said enlarged end of said shaft.

7. The probe assembly according to claim 2, wherein said seal has a hollow cylindrical body with a distal end and a proximal end, said seal further having a flange extending radially outward at said proximal end of said hollow cylindrical body, and said cylindrical body having a uniform wall thickness extending from said proximal end of said cylindrical body to said flange.

8. A probe assembly for a tank, said probe assembly comprising:
   a probe having a shaft with a proximal end and a distal end, said probe including an enlarged head at said distal end, said shaft having a threaded section and an unthreaded section, said threaded section extending from said proximal end and terminating at said unthreaded section and terminating at a distance spaced from said enlarged head; and
   a seal being formed from a plastic material and being mounted about said shaft adjacent said enlarged head, said seal having a hollow cylindrical body with a length, a distal end, and a proximal end spaced along said length from said distal end of said hollow cylindrical body, said seal further having a flange extending radially outward at said proximal end of said hollow cylindrical body spaced from said enlarged head, and said hollow cylindrical body having a uniform wall thickness extending from said distal end of said hollow cylindrical body to said flange and forming a gap between said shaft over a portion of shaft.

9. The probe assembly according to claim 8, said seal being molded about said shaft about said unthreaded section.

10. The probe assembly according to claim 8, said seal being molded about said shaft about a portion of said threaded section and forming a gap between said seal and said threaded section.

11. The probe assembly according to claim 8, said seal forming a gap between said seal and at least a portion of said unthreaded section.

12. The probe assembly according to claim 8, wherein said shaft further includes a knurled section, said unthreaded section extending between said threaded section and said knurled section, and said seal being molded about said knurled section.

13. A probe for a tank probe assembly, said probe comprising:
   a shaft with a proximal end and a distal end, said probe including an enlarged head at said distal end, said shaft having a threaded section, an unthreaded section, and a knurled section, said threaded section extending from said proximal end and terminating at said unthreaded section and terminating at a distance spaced from said enlarged head, and said unthreaded section extending between said threaded section and said knurled section.

14. The probe assembly according to claim 13, wherein said knurled section extends between said enlarged head and said unthreaded section.

15. A method of making a probe assembly, said method comprising the steps of:
   providing a metal shaft with an enlarged head on a distal end of the metal shaft;
   forming threads on only a portion of the metal shaft spaced from the enlarged head;
   covering only a portion of the metal shaft with a sleeve leaving a portion of the metal shaft uncovered by the sleeve;
   molding a plastic seal on the metal shaft and on the sleeve; and
   removing the sleeve relative to the metal shaft to thereby leave a gap between the seal and the metal shaft on the portion of the metal shaft where the sleeve was previously located.

16. The method according to claim 15, further comprising forming a knurled section on the metal shaft, and said molding the plastic seal comprises molding the plastic seal on the knurled section of the metal shaft.

17. The method according to claim 15, wherein said removing the sleeve comprises pulling the metal shaft from the sleeve.

18. The method according to claim 15, wherein said molding includes inserting the metal shaft into a mold cavity of a molding apparatus, the mold cavity including the sleeve, and said inserting the metal shaft includes inserting the metal shaft into the sleeve to thereby inserting the metal shaft into the mold cavity.

19. The probe assembly according to claim 1, wherein said shaft has a knurled section and an unthreaded section, and said seal being molded about said shaft about (1) said unthreaded section or (2) about said knurled section and said unthreaded section.

20. The probe assembly according to claim 19, said seal forming said gap between said seal and said unthreaded section.

\* \* \* \* \*

UNITED STATES PATENT AND TRADEMARK OFFICE
CERTIFICATE OF CORRECTION

| | | |
|---|---|---|
| PATENT NO. | : 12,092,484 B1 | Page 1 of 1 |
| APPLICATION NO. | : 18/436804 | |
| DATED | : September 17, 2024 | |
| INVENTOR(S) | : Matthew A. Thompson | |

It is certified that error appears in the above-identified patent and that said Letters Patent is hereby corrected as shown below:

In the Claims

Column 8
Line 22, Claim 18, "inserting" should be --insert--

Signed and Sealed this
Twenty-second Day of October, 2024

Katherine Kelly Vidal
*Director of the United States Patent and Trademark Office*